United States Patent Office 3,164,547
Patented Jan. 5, 1965

3,164,547
PROCESS FOR REFINING HYDROCARBON OILS SO AS TO OBTAIN ONLY REFINED OIL AND PURE OIL SOLUBLE SULPHONATES
Henri Brunel, 9 Rue du General Niox, Paris, France
No Drawing. Filed June 9, 1960, Ser. No. 36,370
Claims priority, application France July 8, 1959
6 Claims. (Cl. 208—273)

To my knowledge, in all the publications and patents concerning the treatment, especially for the purpose of refining, of hydrocarbon oils, such as petroleum oils for instance, with a sulphonating reagent (sulphuric acid, oleum, $SO_3$ etc.), it is stated that said treatment gives, on the one hand refined oil containing oil soluble sulphonic acids and, on the other hand, a tar or sludge containing the excess of sulphonating reagent in admixture with organic compounds comprising sulphonic acids which are often water soluble.

According to the process described in the present application, there is obtained a different result which presents a great interest for the production of superrefined oils and of purified, oil-soluble sulphonates, inasmuch as this process obtains especially from solvent extracted petroleum oils, only superrefined oil and purified oil soluble sulphonates, this result being obtainable without formation of any acid sludge and with a total yield of superrefined oil and oil-soluble sulphonates which may reach 100% of the weight of the oil treated.

One may wonder why, since the time that oil has been refined by means of sulphonating reagents, the results given by the present process have not yet been obtained and, even, has been considered as not obtainable. Very likely, this is due to the fact that the fraction of reacted oil retained by sulphonating reagents was considered as an impurity and, for the most part, as a waste product requiring long and difficult treatments for extraction of useful products. And yet, despite this current opinion, it was possible, when effecting appropriately the refining with suitable sulphonating reagents, to obtain, in some sort, a clean sludge containing only sulphonic acids besides excess of reagent (said sulphonic acids giving, after neutralization, oil soluble sulphonates, especially when starting from oils already refined by solvent extraction), and even, not to obtain any sludge at all. This will appear evident, now, from the present process but it had to be, first, discovered and demonstrated.

Thus, the process is founded on the following observations and conclusions resulting from the numerous years of experiment that inventor has devoted to the study of the sulphonation of mineral oils.

In a former process, described in copending application Serial No. 192,935, filed May 7, 1962 (now Patent No. 3,149,063, issued September 15, 1964), which is a continuation-in-part of application Serial No. 573,334, filed March 23, 1956, and now abandoned, inventor has disclosed a new and simple manner for extracting and purifying the organic substances contained in the acid sludges in order to obtain pure, oil-soluble, surface-active products. But, when examining the properties of said surface-active products, it appeared to inventor that, in several cases, these properties were almost identical to the properties of the mixtures of the extractant used in said process with current oil soluble sulphonates. Thus, it appeared that the extracted acid sludges were constituted, for a great part, of oil soluble sulphonic acids giving, by neutralization, oil soluble sulphonates.

In order to confirm this observation, analysis of the acid sludges eliminated in the discard dumps of the great European refineries producing white oils and sulphonates were made by inventor and they showed that these waste sludges contained, in fact, a very important proportion of oil soluble sulphonic acids, so that such an elimination of sludges represents a considerable loss of useful products.

Then, while sulphonating under controlled conditions, and with a suitable reagent, oils identical to those treated in said refineries producing white oils and which eliminate the burning of important quantities of acid sludges, inventor has found it was possible to obtain only refined oil and oil soluble sulphonic acids giving, by neutralization, oil soluble sulphonates.

Nevertheless, even when operating under said conditions for obtaining only refined oil and oil soluble sulphonic acids giving, by neutralization, oil soluble sulphonates, an acid sludge separates after sulphonation.

Inventor has shown, then, that the separation of an acid sludge or tar from refined oil is due to the relatively weak solubility of certain oil soluble sulphonic acids in refined oil, so that, when the oil is saturated, the dissolution in the oil of the excess of sulphonic acids formed is no more possible and, consequently, these sulphonic acids remain mixed with the excess of acid reactant to constitute a tar insoluble in oil which separates from said oil. The consequences are a dilution of the sulphonating reagent by the sulphonic acids formed which separate from the treated oil, and, consecutively, a decrease of the primary sulphonating action of said reagent on oil, while, on the contrary, the secondary actions of the same reagent on the sulphonic acids formed become more and more important on account of the intimate contact between said sulphonic acids and the reagent in the tar separated from oil.

Thus, besides conditions for sulphonating in order to obtain the maximum of oil soluble sulphonic acids, the chief problem was to stop the secondary actions of the reagent on the oil soluble sulphonic acids formed. And, on this point, inventor has shown that the most simple expedient for obtaining this result was to neutralize the sulphonic acids immediately after their formation and, anyhow, after the shortest possible time.

Besides, if the solubility of oil soluble sulphonic acids in oil is relatively low, the solubility in oil of the neutral sulphonates, and especially of the alkaline sulphonates coming from the neutralization of said sulphonic acids, is much higher. Furthermore, the aqueous solutions of metal salts resulting from the neutralization of the excess of acid reagents are insoluble in the oily solutions of sulphonates and may be easily separated under suitable conditions.

Moreover, through his experiment, inventor has shown that it is possible to extract the sulphonic acids or sulphonates from their oily solutions, while purifying them from inorganic acids and metal salts, with only small quantities of solvents, when effecting the operations in two steps; first, extracting half purified sulphonates with an alcoholic solvent rich in water, then adding pure alcoholic solvent to the extract and finally distilling slowly the obtained solution.

As to the production of sulphonic acids, it appeared from inventor's experiment that the reagent had to be adapted to the oil to be treated. Theoretically, it would be necessary to determine the concentration of the reagent in $H_2SO_4$ or in $SO_3$ the more appropriate to each of the oils to be treated and, when several treatments are necessary, to each treatment to be effected. But, as this is hardly possible in practice, there is used, according to the oil to be treated, and to the treatment to be effected, one of the reagents currently produced by the chemical industry; sulphuric acid at 66° Baumé, sulphuric acid at 98–100%, and oleum, especially oleum containing 20% of free $SO_3$, and the operations are conducted under defined conditions according to the process in order to obtain, with the reagent chosen, oil soluble sulphonic acids and sulphonic acids able to give oil soluble sulphonates, and to avoid the formation of water soluble sulphonic acids and of products of secondary reactions. For instance, when the oil to be refined contains a very easily sulphonatable fraction, the use of strong sulphonating reagents, such as oleum, would lead to water soluble sulphonic acids, especially during the first sulphonation, whereas, when the oil to be refined does not contain such a very easily sulphonatable fraction, strong sulphonating reagents are necessary to obtain a substantial proportion of oil soluble sulphonic acids which convert to oil soluble sulphonates. In the first case, the first acid treatment will be effected, under conditions according to the process, with sulphuric acid at 66° Baumé, and in the second case with sulphuric acid at 98–100% or with oleum.

Thus, the process, founded on the hereabove stated experimental observations, consists in treating mineral oils constituted of hydrocarbons, such as petroleum oils, and especially petroleum oils refined by solvent extraction, with a sulphonating reagent principally of the group consisting of; sulphuric acid at 66° Baumé, sulphuric acid at 98–100%, oleum and $SO_3$, in order to obtain refined oils, and especially superrefined oils, and sulphonic acids able to give oil soluble sulphonates after neutralization, with a total yield in refined oil and purified sulphonates of up to 100% of the weight of the oil treated. The treatment according to the process comprises the combination of the following operations effected in the following manner: (a) adapting the sulphonating reagent to the composition of the oil to be refined, in order to avoid the formation of water soluble sulphonic acids and of secondary reaction products, by employing; sulphuric acid at 66° Baumé for treating the oils containing an easily sulphonatable fraction, sulphuric acid at 98–100% for treating the oils containing a fraction not sulphonatable by sulphuric acid at 66° Baumé but able to give water soluble sulphonic acids with sulfuric acid containing no free $SO_3$, sulphuric acid containing an important proportion of free $SO_3$, such as oleum, and pure $SO_3$ for treating oils which give oil soluble sulphonic acids under the action of these reagents and upon which the action of sulphuric acid at 98–100% would give but a small proportion of sulphonic acids; (b) effecting the acid treatment under conditions so as to obtain, besides refined oil, with the reagent chosen, only oil soluble sulphonic acids and sulphonic acids which give, after neutralization, oil soluble sulphonates, conditions according to which; the proportion of the reagent is preferably under 15% of the weight of the oil treated, the surface of contact between oil and acid reagent is preferably increased to the maximum, the time of contact between oil and acid reagent and between acid reagent and sulphonic acids formed is reduced to the minimum to provide for the sulphonation without alteration of said sulphonic acids formed, and the temperature is maintained below 35° C.; (c) neutralizing as soon as possible, and preferably immediately after their formation, the sulphonic acids formed; (d) separating, while simultaneously eliminating inorganic acids and metal salts they contain, the sulphonic acids and sulphonates from oil.

In the mind of inventor, the process is applicable to all installations treating oils by sulphonating reagents, as well to the modern and most perfected ones as to the oldest and most rudimentary ones.

In the plants fitted with automatic colloidal mixers for introducing the acid reagent in oil, whatever may be the type of said mixer, the apparatus is regulated, as to speed of introduction, proportion of reagent and temperature, to bring about the conditions hereabove defined according to the process. The colloidal mixture thus obtained is neutralized, either directly and immediately in order to obtain a solution in oil of all the sulphonates formed, or said mixture is centrifuged in order to separate an oily and an acid phase which are immediately neutralized separately. In both variations, the oily solutions of sulphonates obtained are, after a first separation of metal salts by settling or centrifuging, treated as stated hereafter for separation of oil and consecutive purification of sulphonates.

In the plants working according to the old system, without centrifugal machines and by mixing acid reagent with oil in a tank by means of an agitator, the quantity of oil treated and the proportion of reagent employed for each treatment are reduced in order that the introduction of the reagent does not last more than half an hour, the temperature being always maintained below 35° C., as stated. Then, less than 15 minutes after the end of the introduction of the reagent, either the agitation is continued and the total mixture progressively mixed with the neutralizing agent, while cooling, or the agitation is stopped and the mixture allowed to settle. According to this variation, the mixture of sulphonic acids and excess of reagent which gathers at the conical bottom of the vat is progressively drawn off in proportion as it settles and is immediately neutralized. When no more important deposit gathers, the acid oil remaining in the tank is neutralized and treated as stated hereafter for separation of oil and consecutive purification of sulphonates.

Thus, the neutralization of the sulphonic acids formed may be effected, according to the process, either by mixing, as soon as possible and preferably immediately after sulphonation, the totality of the acid mixture comprising oil, sulphonic acids and excess of reagent, with the neutralizing agent, or by separating, as soon as possible and preferably immediately after sulphonation, on the one hand oil saturated with sulphonic acids, and on the other hand excess of sulphonic acids in admixture with excess of reagent, and mixing, immediately and separately, the two fractions with the neutralizing agent.

In the first variation for effecting neutralization, all the sulphonates obtained are in solution in oil. Consequently, in this case, there is no separation of organic substances in admixture with the excess of reagent and, substantially, no production of any acid sludge or tar. In the second variation for effecting neutralization, the oil fraction gives a diluted solution of sulphonates containing only a part of the obtainable sulphonates. The other part (generally the most important one) is obtained from the sulphonic acids separated from oil and which are in admixture with the excess of acid reagent. This variation presents the advantage of allowing the separation of the different kinds of sulphonates obtainable from the sulphonation of a hydrocarbon oil, since the sulphonates obtained from separated oil have usually a lighter color and different solubilities, surface active properties and molecular weight from those which are obtained from the excess of sulphonic acids separated in admixture with the excess of acid reagent.

In any event, in both variations, there are obtained neutralized mixtures constituted of oil, oil soluble sulphonates and metal salts. A first separation of metal salts is effected by simple settling at 70–90° C. and decanting, or by centrifuging. Then, to the oily solutions containing either a low proportion of sulphonates, when they come from acid oil neutralized separately, or a high proportion of sulphonates when they come from the neutralization of the whole acid mixture or of the acid mixture separated from oil, there are added 10 to 25% of a hydroalcoholic solvent containing about half weight of water and half weight of an alcohol having less than 4 atoms of carbon and, preferably, isopropyl alcohol. By settling at 50–70° C., oil, purified hydroalcoholic solution of sulphonates, and metal salts are separated. In a variation, the alcoholic solvent is added, without water, immediately after neutralization, or during neutralization, before any separation of metal salts. Settling in the same conditions permit oil, hydroalcoholic solution of sulphonates and metal salts to separate. In a second step, to the separated purified hydroalcoholic solution of sulphonates, 5 to 20% of an alcohol having less than 4 atoms of carbon, and preferably isopropyl alcohol are added. By settling at 50–70° C., there are again separated; oil, alcoholic solution of pure sulphonates and metal salts.

In the variation according to which acid and oil are neutralized separately, the neutralizing of said oil is preferably effected by mixing with the hydroalcoholic solvent set forth above to which is added an aqueous solution of neutralizing agent, for instance a solution of sodium hydroxide at 40–50% to provide for neutralization. By settling at 50–70° C., oil, hydroalcoholic solution of oil soluble sulphonates and metal salts are separated.

The alcoholic solution of sulphonates finally obtained is distilled to recover the solvent. When it still contains a small proportion of metal salts and oil, said oil separates after the last addition of solvent and forms an upper layer. After evaporating part of the solvent, said layer is redissolved by the sulphonates while an aqueous layer containing the rest of the metal salts, if any, or crystalline metal salts, separate at the bottom. After separating said metal salts and fully distilling the solvent and water, perfectly pure sulphonates are obtained.

After neutralization, drying of the oily solutions of sulphonates obtained may be effected, preferably under vacuum, before mixing with the alcoholic solvent, in order to fully precipitate metal salts and obtain perfectly pure sulphonates.

When separating from acid oil the excess of sulphuric acids in admixture with the excess of reagent, said mixture may be, first, washed with water or alkaline solution, while cooling, before complete neutralization, in order to recover part of the acid reagent and to reduce the quantity of neutralizing agent to be used.

With the same view to permit the recovery of acid reagent and to reduce the quantity of neutralizing agent used, the sulphonic acids may be extracted after sulphonation by means of a hydroalcoholic solvent. It is, thus, possible to separate; oil, an alcoholic solution of sulphonic acids and the greatest part of the excess of acid reagent. The separated solution of sulphonic acids is, then immediately neutralized according to the process.

As to producing different metal sulphonates for different utilizations, the neutralization of the sulphonic acids is effected with different adequate neutralizing agents. For obtaining alkaline sulphonates, the neutralization is usually effected by means of aqueous solutions of sodium hydroxide. But, when the obtained solutions of sulphonates in oil are fluid enough, the neutralization may be effected by mixing with sodium carbonate and, then, drying and filtering or centrifuging. According to this way of operating, the sulphonates are extracted in a pure state by means of the alcolholic solvent, as the dry metal salts have been entirely eliminated when filtering or centrifuging the oil. Drying is preferably effected under vacuum. For obtaining alkaline earth sulphonates, the neutralization may be also effected with neutralizing agents in powder or in aqueous solution or mixture, for instance with solutions of barium hydroxide or with lime-wash. According to the process, the extraction of alkaline earth sulphonates is effected preferably with chlorinated solvents, and especially with trichlorethylene. When alkaline earth bases are used in aqueous solutions or wash, the water is fully evaporated after neutralization and the residue dried before extraction.

In another variation, the neutralization is effected by means of gaseous ammonia or by ammonia in solution in water. There are obtained ammonium sulphonates which, owing to the volatility of the base, are easily converted, according to the process into any other metal sulphonate by action of stable bases or by double decomposition. when the neutralization is effected by means of gaseous ammonia, the ammonium sulphate precipitates, which permits after decanting and filtering, or centrifuging the oily solution, obtaining directly purified sulphonates of ammonium by extraction with the solvent.

When obtaining very pure oils, such as pharmaceutical oils is desired, it is necessary to effect several successive treatments with the sulphonating reagent. Each of these treatments gives, according to the process, a quantity of refined oil and purified sulphonates equal about to the weight of the oil treated. Besides, the properties of the sulphonates obtained and their color vary in proportion as the number of treatments increases. When, furthermore, oil saturated with sulphonic acids in admixture with excess of reagent, and the two fractions are neutralized separately, as stated hereabove, the process obtains separately all the different types of sulphonates which are formed in the sulphonation of all the unsaturated hydrocarbons contained in the oil treated. This result is, from a practical point of view, very important.

Of course, other sulphonating reagents, besides those which are set forth above, may be employed (for instance chlorosulphuric or fluorosulphuric acid), while operating according to the process, as long as said reagents give, in these conditions for operating, with the oil to be refined, oil soluble sulphonic acids and sulphonic acids able to give oil soluble sulphonates. But the reagents set forth hereabove are the preferred reagents.

There must be mentioned also that, though the process is intended, as stated above, especially for obtaining the maximum of oil soluble sulphonates from hydrocarbon oils, it is nevertheless possible, when treating, for instance with oleum, under conditions according to the process, oils containing a very easily sulphonable fraction, such as aromatic fraction, to obtain, from the acid phase separated after sulphonation, purified water soluble sulphonates by immediate neutralization of said acid phase and then separating, while purifying as stated above, the obtained sulphonates. This is especially interesting for obtaining purified water soluble petroleum sulphonates from distillates and extracts, and purified alkyl benzene sulphonates from cuts of synthetic oils containing a sulphonatable fraction.

Now in order to illustrate clearly the realization of his process, inventor will give examples which have been already realized, either in industrial tests to control the results of the treatment of different oils according to the process or in effective industrial production of white oils and sulphonates.

*Example 1*

1,000 kilograms of an oil of the coastal type, known under the commercial appellation of "500 solvents," of a viscosity of 5 to 6° Engler at 50° C., are very finely mixed by agitation, preferably with a turboagitator, in a vat, with 150 kilograms of oleum containing 20% of free $SO_3$. The reagent is introduced progressively in the oil in less than 30 minutes and the temperature is maintained below 35° C. Less than 15 minutes after the end of the introduction of the acid reagent, without stopping the agitation, the intimate mixture is allowed to flow progressively into an aqueous solution of sodium hydroxide of medium concentration, in slight excess, while agitating and cooling. The temperature is maintained under 60° C. during the operation and, at the end, is carried to 80–95° C. After eventual addition of $NaHCO_3$, to obtain a suitable pH, the mixture is allowed to settle between 75 and 95° C., until two layers are perfectly separated. Then, the lower aqueous layer is drawn off. The oily fraction separated is mixed, after eventual addition of $NaHCO_3$, with 120 to 150 kilograms of a solvent constituted of half weight of isopropyl alcohol and half weight of water, or 200 to 250 kilograms of a similar solvent constituted of equal proportions of ethyl alcohol and water. After settling between 50 and 70° C., two or three layers are formed.

They are separated. The upper oily layer consists of about 750 kilograms of refined oil. The medium layer is a hydroalcoholic solution of sulphonates and the lower layer, if any, is an aqueous solution of metal salts which may be partly crystalline, according to the concentration of the neutralizing agent. The hydroalcoholic solution of sulphonates thus separated is mixed with 35 to 60 kilograms of isopropyl or ethyl alcohol at 90%. After settling between 50 and 70° C., the three layers again formed are separated. The lower layer is an aqueous solution of metal salts containing solvent. It is distilled to recover the solvent. The upper layer is refined oil. About 50 kilograms of refined oil are thus recovered. The middle layer is an alcoholic solution of sulphonates purified from metal salts. This solution is distilled to recover the solvent and to obtain purified sulphonates. The addition of alcohol followed by settling and decantation may be repeated to perfect the purification. The separations are improved by cooling followed by re-warming. About 250 kilograms of purified oil soluble sulphonates are finally obtained. All the separations may be accelerated by centrifuging.

In order to obtain very pure oils, other acid treatments of the oil thus once refined will be successively effected under the same conditions until the degree of purity desired is obtained. With each treatment, purified, oil soluble sulphonates and re-refined oil are obtained and the total weight of said oil and sulphonates is about the weight of the oil treated. At no time is there any formation of any acid sludge. Besides, no acid emanations are produced during the neutralization since the acid mixture is introduced into alkaline solution in excess, so that the conditions of work are perfectly clean and healthy.

In the case of such viscous oils giving important quantities of sulphonates and of several successive acid treatments, it may be better, or even necessary with the hydroalcoholic solvent to effect a second extraction of the sulphonates that may remain in the oil after the first one, in order to obtain an oil as clean as possible for the next acid treatment.

When complete refining, for instance for obtaining pharmaceutical oils, is desired it is, thus, necessary to proceed to several successive acid treatments. In this case, the later treatments, and especially the last one, give but few sulphonic acids so that there is no more interest in trying to obtain said sulphonic acids which are diluted with a high proportion of acid reagent in excess. Then, the excess of reagent containing a small proportion of sulphonic acids is, after the last, or even after the two last acid treatments, allowed to separate and, then, it is drawn off. The acid reagent may be used for other operations of sulphonation or refining or for recovery of the sulphuric acid it contains.

The acid oil obtained after the last treatment is, then, mixed with 10 to 20% of the hydroalcoholic solvent set forth hereabove, to which is added the quantity of an aqueous solution of sodium hydroxyde at 40–50% necessary for obtaining neutralization, and the neutralized mixture is allowed to settle at 50–70° C. Then, the three layers formed which are respectively constituted of refined oil, alcoholic solution of sulphonates and aqueous solution of metal salts, are separated. Hydroalcoholic solutions of alkanolamine soaps are also used. When, on account of the viscosity of the oil, said operation does not provide, even after a second extraction by hydroalcoholic solvent, a completely clarified oil, the acid oil is, first, before any introductions of solvent and before neutralization, mixed with a metal oxide such as aluminum oxide for instance, or with sodium aluminate, or with an absorptive earth, and then allowed to settle between 50 and 70° C. and decanted or centrifuged. Then, the oil is treated with carbonate of sodium, when hot, and finally with activated bleaching earth and filtered.

Thus, after four to six treatments according to the process, depending on the composition of the oil to be refined which may vary considerably with the origin of the crude, there are obtained, on an average, 400 to 600 kilograms of perfectly pure oil of about 5° Engler viscosity at 50° C., colorless, without any taste nor odor and in conformity with the pharmacopoeia specifications as to the acid test. Besides, 500 to 600 kilograms of purified oil soluble sulphonates are obtained. Their color varies from clear yellow and orange brown for those coming from the first treatments, to mahogany red and dark red for those coming from the last treatments.

In a variation, after the acid treatment of the oil to be refined and its neutralization, 100 to 200 kilograms of ethyl, or better isopropyl alcohol at 90% are added, while mixing, before the separation of any aqueous fraction. There are, then, formed, by settling between 50 and 70° C., three layers instead of two when settling before adding the solvent. The upper layer is constituted of refined oil, the medium one of a hydroalcoholic solution of sulphonates still containing metal salts and the lower one of an aqueous solution of metal salts containing alcoholic solvent. In the same variation, the solvent added before settling may be either mixed to the neutralized mixture or before neutralization. In any event, the three layers formed are separated and, to the hydroalcoholic solution of sulphonates thus obtained, there are added, while mixing, at 50–70° C.; 5 to 20% of ethyl or isopropyl alcohol at 90% and the mixture is again allowed to settle at the same temperature until formation of three limpid layers which are then separated. This operation may be repeated. The separation may be improved by the addition of small quantities of bicarbonate of sodium. As in the first way for proceeding stated hereabove, a purified alcoholic solution of sulphonates is finally obtained. It is distilled to recover the alcohol and obtained purified sulphonates.

In another variation, after sulphonation, neutralization, settling and separation of the aqueous lower layer of metal salts, the separated oily solution of sulphonates is first dried, preferably under vacuum, and then filtered, before adding the extracting solvent. When operating as stated hereabove, drying of sulphonates may be also effected before the last addition of solvent in order to obtain a still higher degree of purity.

In plants equipped for continuous work, the automatic mixing system used for introducing the acid into the oil is regulated to obtain the conditions hereabove defined for sulphonation according to the process, in order to obtain the maximum of oil soluble sulphonic acids and sulphonic acids which give oil soluble sulphonates; proportion of reagent under 15% of the weight of the oil treated, surface of contact as great as possible (which is obtained by using colloidal mixers), time of contact as short as possible which permits the production of only oil soluble sulphonic acids and no other products, temperature under 35° C. for avoiding the formation of secondary reaction products. Then, the emulsified mixture of oil, sulphonating reagent in excess and sulphonic acids formed is, also by means of an automatic mixer, brought into contact with the neutralizing agent before any separation of acid tar and the neutralized mixture is immediately centrifuged. The separated solution of sulphonates in oil is sent to another mixer and to another separator for introducing the alcoholic solvent and separate the alcoholic solution of sulphonates. Finally, the separated oil fraction, after drying and cooling, returns to an acid mixer for the second acid treatment, and so on until the degree of refining desired is obtained.

*Example 2*

The production of highly refined oils such as pharmaceutical oils is a delicate work requiring great precautions so that it is observed that, in plants producing said oils, the usual way for operating is not readily changed. Thus, inventor has tried to adapt the conditions for realizing his process in order not to change those of the usual operations which are considered as fundamental, but keeping nevertheless the chief characteristics of the present process for obtaining the hereabove stated results.

So, it is often considered that the separation from oil of what is considered as an acid sludge (even when, by sulphonating under conditions according to the process, said "acid sludge" is consituted of sulphonic acids and excess of reagent) is absolutely necessary for obtaining a good quality oil. The present example, corresponding to the variation for neutralizing stated hereabove, indicates how to respect such a requirement.

1,000 kilograms of the oil set forth in Example 1 or of a more fluid oil of the same type; for instance "300 solvent" having a viscosity of 2.5 to 3.5° Engler at 50° C., are treated with 15% of oleum containing 20% of free $SO_3$, as in Example 1, in a vat having a conical bottom, preferably cooled. Less than 15 minutes after the end of the introduction of the reagent, the agitation is stopped and the mixture is allowed to settle. After ½ hour to one hour for fluid oil and a few hours for more viscous oil, one begins to draw off the heavier phase comprising the mixture of excess of sulphonic acids and excess of reagent gathered in the conical bottom of the vat, and said mixture is immediately introduced, progressively, into an aqueous solution of sodium hydroxide at a concentration of 20%, agitated and cooled. If the drawing off is effected slowly, the heavier phase will gather as rapidly as it will be drawn off for neutralization, until all this heavier phase is separated which appears when oil comes off instead of acid mixture. When the heavier phase is drawn off rapidly, it is stopped before oil comes and repeated periodically, for instance every hours, and, at each time, the drawn off fraction is neutralized. After neutralization of all the drawn off acid fraction, the obtained mixture is allowed to settle between 70 and 90° C. Then, the lower aqueous layer which separates is eliminated and the separated organic fraction which constitutes the upper layer is mixed with 5 to 20% of aqueous ethyl or, better, isopropyl alcohol at 90% concentration after addition of a few percent of $NaHCO_3$ when the pH is too alkaline. Then, the mixture is again allowed to settle between 50 and 70° C. and the lower aqueous layer which separates is drawn off. Another addition of alcohol, followed by settlement and decantation, may be effected to perfect purity. By washing the drawn off acid fraction with water before neutralization, or by eliminating acid fractions which separate easily during the neutralization, it is possible to reduce the quantity of neutralizing agent required. An upper layer of refined oil also often separates after addition of solvent. It may be recovered. The alcoholic solution of pure sulphonates obtained finally is distilled, as in Example 1, for recovering the solvent and obtaining the pure sulphonates.

As to the oil remaining in the sulphonation vat after the complete drawing off of the acid fraction, it is mixed with 10 to 20% of the hydroalcoholic solvent set forth in Example 1, to which is added, in proportion for obtaining neutralization, an aqueous solution of sodium hydroxide at 40-50%, and the mixture is allowed to settle between 50 and 70° C. The, oil, hydroalcoholic solution of sulphonates and aqueous solution of metal salts are separated and the solution of sulphonates, after a new mixing with alcoholic solvent, as set forth hereabove, is again allowed to settle under the same conditions in order to separate a pure alcoholic solution of sulphonates which is finally distilled.

While operating according to this example, the sulphonates obtained from the oil fraction present difference of properties from those obtained from the acid fraction. Especially, the sulphonates obtained from the oil fraction are the most soluble in oil and they usually are of a lighter color. It is thus possible to obtain separately, as already stated hereabove, the different kinds of sulphonates obtainable from the sulphonatable fraction of the oil treated.

The same way of operating may be used for continuous production. In the plants fitted with centrifugal machines, the emulsion of oil, sulphonic acids in excess and excess of reagent, coming from the automatic mixer, is centrifuged and the oil fraction and acid fraction thus separated are neutralized separately and treated as set forth hereabove.

From a first treatment under the conditions set forth above there are obtained, on an average, according to the composition of the oil treated; 700 to 800 kilograms of refined oil, 40 to 100 kilograms of pure, clear sulphonates from oil and 100 to 180 kilograms of sulphonates of a darker color from the separated acid fraction. After a second treatment under the same conditions, there are obtained; 650 to 700 kilograms of re-refined oil, 40 to 100 kilograms of clear sulphonates from oil and 50 to 100 kilograms of mahogany sulphonates from the separated acid fraction.

*Example 3*

1,000 kilograms of one of the oils set forth in Examples 1 and 2 are treated with the same acid reagent in the same proportion, while operating as indicated in said examples. Less than 15 minutes after the end of the introduction of the acid reagent, the acid mixture is neutralized by mixing with a lime wash containing an excess of lime. When the neutralization is ended, the mixture is heated and kept boiling until complete evaporation of water. Vacuum may be used for accelerating evaporation. When operating without vacuum, the heating is progressively increased so as to reach the temperature of 140-150° C., in order to completely dehydrate the mixture. In any event, the dry, oily product thus obtained is then mixed with a chlorinated solvent such as trichlorethylene or dichlorethane, for instance, in proportion which provides a fluid mixture. Said fluid mixture is then filtered and the filtrate is distilled for recovering the solvent and obtaining the pure sulphonates of calcium in concentrated solution in oil. There is thus obtained 750 to 850 kilograms of said concentrated solution. The yield may be increased by washing the sediment with the solvent and re-filtering. The total amount of concentrated solution of calcium sulphonates in oil may, then, be above 900 kilograms. Instead of a chlorinated solvent one may use a fluid oil or kerosene which, then, may remain with the sulphonates as a diluting agent for different utilizations.

In order to obtain barium sulphonates, an aqueous barium hydroxide solution is used instead of lime-wash. Crystalline hydrate of barium hydroxide may also be used.

When operating as in Example 2, by separating, after sulphonation, an acid and an oily fraction, these two fractions may be treated separately the same as stated in the present example for the whole acid mixture, or each of them may be treated differently. For instance, one may be treated according to Example 3, for obtaining alkaline earth sulphonates, and the other one according to Example 2, for obtaining alkaline sulphonates. Besides, other metal sulphonates may be obtained by the same method, for instance lithium sulphonates and aluminum sulphonates.

*Example 4*

1,000 kilograms of one of the oils defined in Examples 1 and 2 are treated with the same sulphonating reagent in the same proportion and under the same conditions. But the neutralization is effected by means of a current of gaseous ammonia, with a continuous mixer or in a vat, without stopping the agitation between sulphonation and neutralization. At the end of the operation, the temperature is raised to 85-105° C. and maintained until all the water is evaporated or, better, the evaporation of said water is effected at a lower temperature, under vacuum. Then, the ammonium sulphate which precipitates is separated by filtration or centrifuging. From the limpid oily solution of ammonium sulphonates thus obtained, the sulphonates are separated and consecutively purified of any remaining sulphates by means of an alcoholic solvent as in Example 1.

Said ammonium sulphonates are, next, converted into other metal sulphonates by heating with aqueous solutions of strong bases such as alkaline and alkaline earth bases, or by double decomposition while heating with solutions of water soluble metal salts such as solutions of CaCl$_2$. A great number of metal sulphonates are obtainable by operating this way. For instance; lithium, aluminum, molybdenum, sulphonates etc., these examples being not limitative. This permits obtaining said metals in an emulsifiable combination for diverse utilizations, especially for special lubricating, cutting, and emulsifiable oils.

When operating with the commercial solution of ammonia in water instead of gaseous ammonia, the operations may be conducted as in Example 1 when using alkaline solutions, but with stronger cooling or in closed apparatus in order to avoid the volatilization of the gaseous base.

The ammonium sulphate is recovered. By action of a stable base, ammonia may be regenerated and re-employed.

When operating as stated in Example 2, the two fractions separated after sulphonation may both be treated as stated in the present example or the fractions may be treated differently. For instance, the oily fraction may be treated as in the present example while the acid fraction may be treated as in Example 2 for obtaining alkaline sulphonates. Such a possibility must be emphasized as it shows the great number of possible utilizations of the process already specified at the end of Example 3.

*Example 5*

After sulphonating the same oils as in Examples 1 and 2 or more fluid oils of the same type, there are added to the acid mixture of oil, sulphonic acids and reagent, 10 to 25% of the hydroalcoholic solvent stated in Example 1. After settling, two or three layers, according to the oil, are rapidly obtained, especially with fluid oils. Oil, alcoholic solution of sulphonic acids and excess of reagent are, thus, separated. The alcoholic solution of sulphonic acids is immediately neutralized and the operations are followed as in Example 1. When treating viscous oils, a second washing of the acid oil with the solvent is often necessary to extract all the sulphonic acids from sulphonated oil. The variation according to said example is interesting only when the recovery of sulphonic acids is desired. Besides it allows the recovery of an important part of the excess of sulphonating reagent.

*Example 6*

1,000 kilograms of spindle oil of the naphthenic type, having a viscosity of 2 to 3° Engler at 50° C., are sulphonated as in Example 1. According to the easily sulphonatable fraction contained in the oil, a part of the hydrocarbons combine with more than one molecule of SO$_3$, so that an important proportion of the sulphonic acids formed in this first acid treatment and even in a second one following the first one, are water soluble and give, after neutralization, water soluble petroleum sulphonates which may be, nevertheless separated from retained oil and consecutively purified according to the process. One may, thus, obtain finally, while operating as in Example 2; refined oil, purified oil soluble sulphonates from the oil fraction separated after sulphonation, and purified water soluble sulphonates from the acid fraction. After three successive treatments, there are thus obtained; 550 to 600 kilograms, according to the composition of the treated oil, of white oil suitable for perfumery use, 100 to 150 kilograms of purified, clear, oil soluble sulphonates and 250 to 350 kilograms of purified water soluble sulphonates.

But according to the process, and as explained in the statement, by appropriately selecting the acid reagent to the composition of the spindle oil treated, it is possible to obtain only sulphonates having a solubility in oil. Thus, by using, for the first acid treatment, sulphuric acid at 66° Baumé, there are obtained sulphonates which have a solubility in water and in oil and which, consequently, are very interesting for preparing emulsifiable mineral oils. The second acid treatment is effected also with sulphuric acid at 66° Baumé or, according to the composition of the oil, with sulphuric acid at 98-100%. The last treatment is effected with sulphuric acid at 98-100% or with oleum. For each treatment, the operations are conducted according to the process, as explained in the specification and statement and as described in Examples 1 and 2. Finally, there are obtained; 500 to 600 kilograms of white oil and 350 to 450 kilograms of sulphonates which all have a solubility in oil.

*Example 7*

An oil coming from extracted fractions in solvent refining, constituted of unsaturated hydrocarbons, and having a viscosity of 3 to 4° Engler at 50° C., is treated, as in Example 6, first with sulphuric acid at 66° Baumé, and then with sulphuric acid at 98-100%, the operations being conducted as stated according to the process, there are obtained, with a yield of about 100% altogether, on the one hand, purified sulphonates having a solubility in oil and useful for preparing emulsifiable mineral oils, and, on the other hand, clear, still unsaturated oils useful as the original extract, in the industry of plastic materials and of rubber, but with the advantage of a very light color.

The same treatment has been effected starting from Spanish shale oils, and similar results have been obtained. By following the treatment with oleum, white oil is finally obtained besides oil soluble sulphonates.

*Example 8*

An alkyl-aryl cut containing a fraction of unsulphatable hydrocarbons and having a molecular weight higher than dodecylbenzene, is treated as in Example 1 or 2. There are obtained purified synthetic sulphonates having a solubility in oil, and a light, white, synthetic oil. This example is cited to emphasize the possibilities of application of the process for refining, with consecutive production of oil soluble sulphonates, certain cuts obtained from synthetic oils.

I claim:
1. In a process for refining hydrocarbon oils the steps comprising
   providing a hydrocarbon oil mixture containing fractions of at least two of the following groups, (a) hydrocarbons adapted to be easily sulfonated by 66° Bé. sulfuric acid, (b) hydrocarbons adapted to be sulfonated by 98-100% sulfuric acid, and (c) hydrocarbons adapted to be sulfonated by oleum but not by 98-100% sulfuric acid,
   sulfonating said hydrocarbon oil mixture with no more than 15% of that sulfuric acid set forth above which has the lowest concentration to react with the sulfonatable hydrocarbon fraction of said oil while maintaining the temperature of the reaction mix, below 35° C.,
   substantially immediately thereafter neutralizing the mixture, before any separation, whereby only two phases are formed, an oil phase and an acid phase, said oil phase containing substantially all of the hydrocarbon sulfonates,
   separating the phases,
   extracting oil soluble sulfonates from the separated oil phase, and
   treating the extracted oil phase with that sulfuric acid set forth above which has the next higher concentration to react with the next more difficultly sulfonatable hydrocarbon fraction remaining in said oil.
2. The process as claimed in claim 1 comprising extracting the sulfonic acids from said oil phase by mixing with an approximately 50% aqueous solution of an alcohol having 1-4 carbon atoms and separating the two phases of the mix.

3. The process as claimed in claim 1 wherein said oil-acid mix is neutralized with ammonia to provide ammonium sulfonates.

4. The process as claimed in claim 1 wherein said hydrocarbon oil mixture is an oil fraction consisting essentially of unsaturated hydrocarbons.

5. The process as claimed in claim 1 wherein said hydrocarbon oil mixture is a cut from a synthetic hydrocarbon oil.

6. In a process for refining hydrocarbon oils the steps comprising providing a hydrocarbon oil mixture containing fractions of at least one of the following groups: (a) hydrocarbons adapted to be easily sulfonated by 66° Bé. sulfuric acid (b) hydrocarbons adapted to be sulphonated by 98–100% sulfuric acid but not by 66° Bé. sulphuric acid and (c) hydrocarbons adapted to be sulfonated by oleum but not by 98–100% sulphuric acid,
introducing into said hydrocarbon oil mixture about but no more than 15% of that sulfuric acid set forth above which has the lowest concentration to react with the sulfonatable hydrocarbon fraction of said oil while agitating the mix to promote the reaction between the hydrocarbon fraction and the acid and while maintaining the temperature of the reaction mix below 34° C.
discontinuing the agitation within about 45 minutes after first introducing the acid into said oil mixture,
separating the phases of said mix to provide an oily phase and an aqueous phase,
substantially immediately thereafter neutralizing the oily phase, and
extracting oil soluble sulfonates from the oily phase.

References Cited in the file of this patent

UNITED STATES PATENTS

| | | |
|---|---|---|
| 1,388,517 | Cobb | Aug. 23, 1921 |
| 1,824,615 | Myers | Sept. 22, 1931 |
| 2,335,006 | Giraitis | Nov. 23, 1943 |
| 2,515,197 | Cohen | July 18, 1950 |
| 2,788,310 | Wilson et al. | Apr. 9, 1957 |
| 2,882,220 | Mikeska et al. | Apr. 14, 1959 |
| 2,885,355 | Schneider et al. | May 5, 1959 |

OTHER REFERENCES

Bell: American Petroleum Refining, D. Van Nostrand Company, Inc., New York, 1959 (pages 274–276 relied upon).

Kalichevsky et al.: Petroleum Refining With Chemicals, Elsevier Publishing Co., New York, 1956, pages 74 and 82–85, TP–690–K27p.